US012804163B2

(12) United States Patent
Ardö et al.

(10) Patent No.: US 12,804,163 B2
(45) Date of Patent: Nov. 17, 2026

(54) METHOD AND VIDEO PROCESSING SYSTEM FOR UPDATING A BUFFER

(71) Applicant: Axis AB, Lund (SE)

(72) Inventors: Björn Ardö, Lund (SE); Andreas Muhrbeck, Lund (SE); Bertil Roslund, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 18/956,444

(22) Filed: Nov. 22, 2024

(65) Prior Publication Data

US 2025/0211757 A1 Jun. 26, 2025

(30) Foreign Application Priority Data

Dec. 20, 2023 (EP) .................................... 23218634

(51) Int. Cl.
*H04N 19/126* (2014.01)
*H04N 19/147* (2014.01)
*H04N 19/172* (2014.01)

(52) U.S. Cl.
CPC ......... *H04N 19/147* (2014.11); *H04N 19/126* (2014.11); *H04N 19/172* (2014.11)

(58) Field of Classification Search
None
See application file for complete search history.

(56) References Cited

U.S. PATENT DOCUMENTS 7,711,044 B1 5/2010 Hoang et al.
9,258,560 B2 2/2016 Tajime et al.
2007/0263126 A1 11/2007 Chao et al.
2012/0262598 A1* 10/2012 Ishii .................... H04N 19/115 375/240.03
2014/0192267 A1 7/2014 Biswas et al.
2021/0241427 A1 8/2021 Mccombe et al.

OTHER PUBLICATIONS

Extended European Search Report, European Patent Application No. 23218634.6, dated Mar. 25, 2024.

* cited by examiner

*Primary Examiner* — Tyler W. Sullivan
(74) *Attorney, Agent, or Firm* — Volpe Koenig

(57) ABSTRACT

An image processing system stores a set of pixel values for a set of pixels relating to a sequence of video frames obtained from a buffer. The pixel values have been filtered using a filtering algorithm to reduce temporal noise. A measure noise related to the pixel values is obtained and a current set of pixel values is obtained from a sensor. A new set of pixel values is then determined based on the stored pixel values and the current pixel values using the filtering algorithm to reduce temporal noise. A measure of noise in the new set of pixel values is then determined and the new set of pixel values is quantized. The higher amount of noise in the new set of pixel values, the higher quantizing is performed. The quantized set of pixel values are compressed and the buffer is updated with the compressed quantized pixel values.

13 Claims, 2 Drawing Sheets

METHOD AND VIDEO PROCESSING SYSTEM FOR UPDATING A BUFFER

TECHNICAL FIELD

The present invention relates to updating a buffer, and specifically to updating a buffer used for reduction of temporal noise in relation to current pixel values of a current video frame of a sequence of video frames.

BACKGROUND

When providing new image data in relation to a video frame of a sequence of video frames from a sensor in a camera, e.g., for subsequent encoding by an encoder, a buffer such as an infinite impulse response (IIR) filter buffer may be used storing image data in which temporal noise is reduced. The stored image data in the buffer are combined with the image data from the sensor to reduce temporal noise, e.g., before being provided to the encoder. Furthermore, the image data from the sensor is also used in combination with the stored image data to determine new image data to update the buffer. As the stored image data and the new image data need to be read from and written to the buffer, respectively, for each new image frame, compression is used before storing the new image data in the buffer in order to reduce the bandwidth required to read from and write to the buffer. The use of such compression is known but further compression is desirable.

U.S. Pat. No. 7,711,044B1 discloses noise reduction systems and methods comprising transforming a residual signal to produce transform coefficients, and applying the transform coefficients to a quantization matrix and a configurable gain matrix to provide a frequency-selective weighting of the transform coefficients having a gain that is sensitive to noise levels.

SUMMARY OF THE INVENTION

An object of the present invention is to overcome or at least mitigate the problems and drawbacks of prior art.

According to a first aspect, a method is provided for updating a buffer. The method comprises obtaining, from the buffer, a stored set of pixel values for a set of one or more pixels relating to previous video frames in a sequence of video frames. The stored set of pixel values have been filtered using a filtering algorithm to reduce temporal noise. The method further comprises obtaining, from a sensor, a current set of pixel values for the set of one or more pixels in a current video frame. The method further comprises determining new set of pixel values for the set of one or more pixels for storing in the buffer based on the stored set of pixel values and the current set of pixel values using the filtering algorithm to reduce temporal noise. The method further comprises determining a measure of amount of noise in the new set of pixel values, and quantizing the new set of pixel values based on the measure of amount of noise in the new set of pixel values. The higher the measure of amount of noise in the new set of pixel values, the higher quantizing is performed. The method further comprises compressing the quantized new set of pixel values, and updating the buffer with the compressed quantized new set of pixel values.

By determining the measure of amount of noise in the new set of pixel values and then quantizing the new set of pixel values based on the measure of amount of noise in the new set of pixel values such that the higher the measure of amount of noise in the new set of pixel values, the higher quantizing is performed, further compression is achieved of the new set of pixel values without corresponding reduction of visible side effects. With further compression, the bandwidth required to read from and write to the buffer is reduced.

The method may further comprise determining a measure of probability that a change in the current set of pixel values in relation to the stored set of pixel values, or in other words a difference between the current set of pixel values and the stored set of pixel values, is due to changes in the scene. Determining the new set of pixel values for storing in the buffer may then be further based on the measure of probability that a change in the current set of pixel values in relation to the stored set of pixel values is due to changes in the scene.

By this, further compression of the new set of pixel values is achieved without corresponding reduction of visible side effects. With further compression, the bandwidth required to read from and write to the buffer is reduced.

The method according may further comprise determining a first weight by which the stored set of pixel values should be multiplied and a second weight by which the current set of pixel values should be multiplied to produce the new set of pixel values. The higher the probability that a change in the current set of pixel values in relation to the stored set of pixel values is due to changes in the scene, the lower the first weight is in relation to the second weight.

The method may further comprise obtaining a measure of amount of noise in the stored set of pixel values. The relation between the first weight and the second weight may then be further based on the measure of amount of noise in the stored set of pixel values such that the higher the measure of amount of noise in the stored set of pixel values, the lower the first weight is in relation to the second weight.

It is to be noted that that by "the lower the first weight is in relation to the second weight" is not meant that the first weight is always lower than the second weight but that with an increased measure of amount of noise in the stored pixels, the size of the first weight is reduced in relation to the second weight.

The new set of pixel values for storing in the buffer may be determined further based on the measure of amount of noise in the stored set of pixel values.

The method may further comprise obtaining a measure of amount of noise in the current set of pixel values from the sensor. The new set of pixel values for storing in the buffer may then be determined further based on the measure of amount of noise in the current set of pixel values. The relation between the first weight and the second weight may then be further based on the measure of amount of noise in the current set of pixel values such that the higher the measure of amount of noise in the current set of pixel values, the higher the first weight is in relation to the second weight.

The buffer may be an infinite impulse response, IIR, buffer, and wherein the filter algorithm used to reduce temporal noise is IIR filtering.

Obtaining the stored set of pixel values from the buffer may comprise retrieving a compressed stored set of pixel values for the set of one or more pixels relating to previous video frames in the sequence of video frames and decompressing the compressed stored set of pixel values to obtain the stored set of pixel values. The compressed stored set of pixel values has been filtered using a filtering algorithm to reduce temporal noise.

According to a second aspect, a non-transitory computer-readable storage medium is provided having stored thereon instructions which, when executed in a video processing system having a processing capability, causes the video processing system to perform the method of the first aspect.

The above-mentioned optional additional features of the method according to the first aspect, when applicable, apply to the non-transitory computer-readable storage medium according to the second aspect as well. In order to avoid undue repetition, reference is made to the above.

According to a third aspect, a video processing system configured for updating a buffer is provided. The video processing system comprises circuitry configured to execute a first obtaining function, a third obtaining function, a first determining function, a second determining function, a quantizing function, a compressing function, and a updating function. The first obtaining function configured to obtain, from the buffer, a stored set of pixel values for a set of one or more pixels relating to previous video frames in a sequence of video frames, wherein the stored set of pixel values has been filtered using a filtering algorithm to reduce temporal noise. The third obtaining function configured to obtain, from a sensor, a current set of pixel values for the set of one or more pixels in a current video frame. The first determining function configured to determine a new set of pixel values for the set of one or more pixels for storing in the buffer based on the stored set of pixel values and the current set of pixel values using the filtering algorithm to reduce temporal noise. The second determining function configured to determine a measure of amount of noise in the new set of pixel values. The quantizing function configured to quantize the new set of pixel values based on the measure of amount of noise in the new set of pixel values, wherein the higher the measure of amount of noise in the new set of pixel values, the higher quantizing is performed. The compressing function configured to compress the quantized new set of pixel values. The updating function configured to update the buffer with the compressed quantized new set of pixel values.

The above-mentioned optional additional features of the method according to the first aspect, when applicable, apply to the video processing system according to the third aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the system described or acts of the methods described as such system and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended figures. The figures should not be considered limiting but are instead used for explaining and understanding.

DETAILED DESCRIPTION

The present invention will now be described with reference to the accompanying drawings, in which currently preferred embodiments of the invention are illustrated. This invention may, however, be embodied in many different forms and should not be construed as limited to the embodiments set forth herein.

Embodiments of the present invention are applicable for example in scenarios wherein a respective set of pixel values is stored in a buffer for each set of one or more pixels. The one or more pixels may for example be one or more adjacent pixels. The stored set of pixel values may for example relate to a value for light intensity and a value for spectral profile (color) e.g., using the color spaces YCbCr or other. It is to be noted that the values for light intensity and spectral profile may be stored at different resolutions such that for example light intensity is stored at a higher resolution, such as for each pixel, whereas spectral profile (color) is stored at a lower resolution, such as for each n×m pixel where at least one of n and m are larger than one. Each stored set of pixel values relates to a respective set of one or more pixels in previous video frames in a sequence of video frames from a sensor in a camera and has been filtered using a filtering algorithm to reduce temporal noise applied for the buffer. Each stored set of pixel values is then combined with a respective set of current pixel values for a corresponding set of one or more pixels of a current video frame obtained from a sensor to form a new set of pixel values with which the buffer is updated. By the 'corresponding' set of one or more pixels of the current video frame is meant the set of one or more pixels in the current video frame that has the same location as the set of one or more pixels to which the stored set of pixel values relates. Each stored set of pixel values may then also be combined with the current set of pixel values for the corresponding set of one or more pixels of the current video frame obtained from the sensor to form an output set of pixel values that may be forwarded to an encoder for encoding, typically via further image processing steps. It is to be noted that the method is applicable also together with image stabilization. In such a case 'same location' may mean the same location after pixels have been moved based on the image stabilization.

Figure 1:
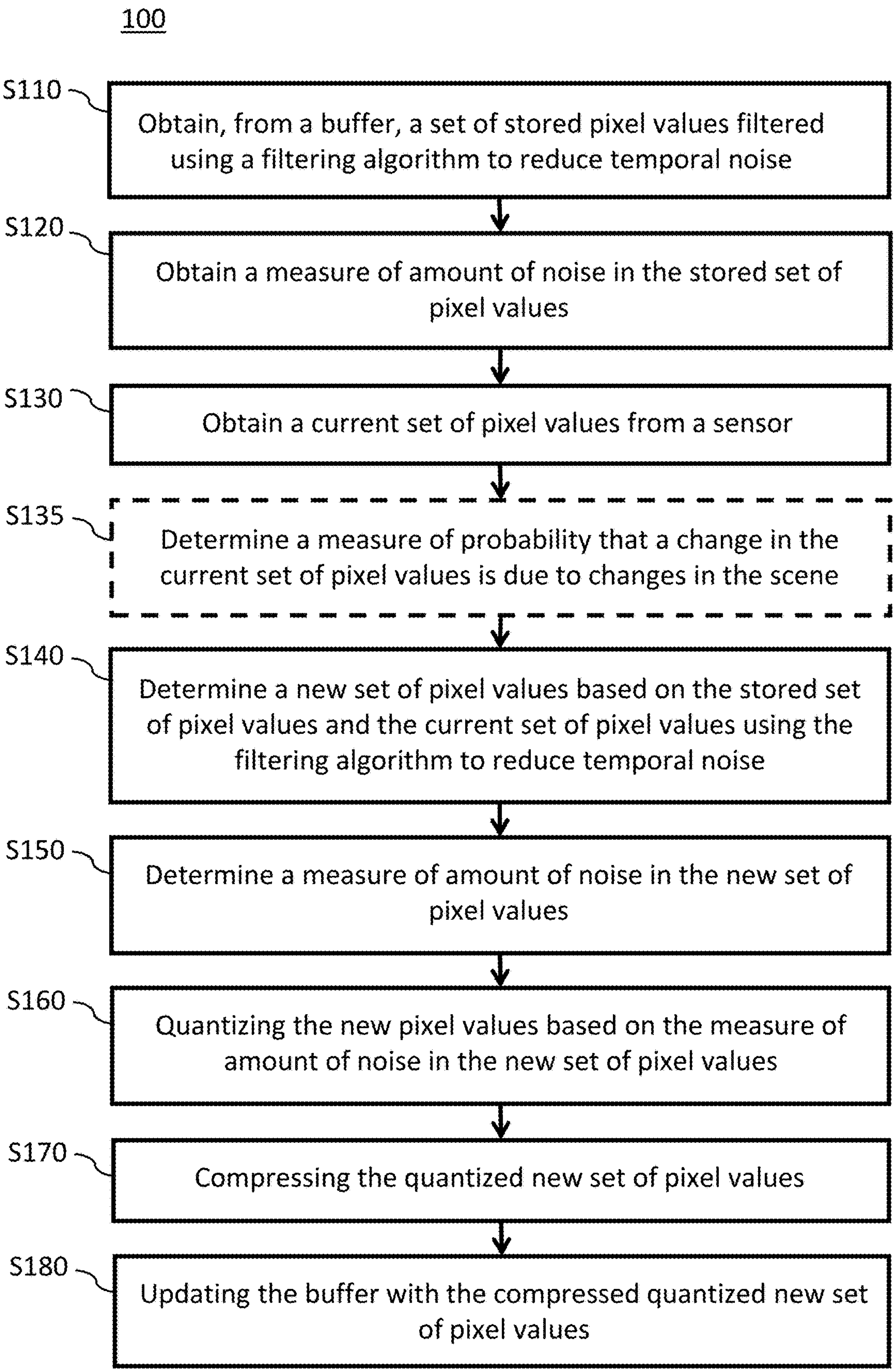
FIG. 1 show flow charts in relation to embodiments of a method for updating a buffer.

Embodiments of a method 100 in a video processing system for updating a buffer will now be described in relation to the flow chart in FIG. 1. The method relates to updating the buffer in relation to a set of one or more pixels, wherein a respective set of pixel values is provided for each set of one or more pixels. The method may be performed for any set of n×m pixels where n and m are integers greater or equal to one. In order to update the buffer in relation to all pixels, the method will be performed for each set of one or more pixels.

The method comprises obtaining S110 a set of stored pixel values for a set of one or more pixels from the buffer. The stored set of pixel values for the set of one or more pixels relates to previous video frames in a sequence of video frames from a sensor in a camera in that the stored set of pixel values has been filtered using a filtering algorithm to reduce temporal noise over time. For example, if there has not been any change in the scene in relation to the set of one or more pixels in the previous video frames in the sequence of video frames, the set of pixel values for the set of one or more pixels would include the same set of pixel values for all previous frames except from noise. The buffer is then updated such that the temporal noise is reduced over time. For example, the buffer may be an infinite impulse response, IIR, buffer, and the filter algorithm used to reduce temporal noise would thus be IIR filtering. Any kind of buffer could be used implementing a convergent filtering algorithm to reduce temporal noise.

The stored set of pixel values in the buffer is typically compressed. Hence, obtaining S110 the stored set of pixel values from the buffer may comprise retrieving a compressed stored set of pixel values for the set of one or more pixels from the buffer and then decompressing the compressed stored set of pixel values to obtain the stored set of pixel values.

In addition to obtaining S110 the stored set of pixel values for the set of one or more pixels, a measure of amount of noise in the stored set of pixel values is also obtained S120. The measure of amount of noise in the stored set of pixel values may be determined each time the buffer is updated and the measure of amount of noise in the stored set of pixel values may be stored, e.g., in an additional buffer, such that when a new set of pixel values is to be determined for updating the buffer, the measure of noise in the stored set of pixel values may be obtained S120 from the additional buffer. For example, a level of convergence may be determined for the set of pixel values to be stored each time the buffer is updated and this level of convergence for the set of pixel values to be stored may be stored in the additional buffer. The measure of noise is then obtained S120 by deriving it from the level of convergence. Specifically, if the level of convergence is low, the set of pixel values stored in the buffer has a high measure of amount of noise, and if the level of convergence is high, the set of pixel values stored in the buffer has a low measure of amount of noise. A high level of convergence means that the difference in the set of pixel values in the buffer is low between updates of the buffer for successive video frames. In alternative to storing the measure of amount of noise in the stored set of pixel values in an additional buffer, the measure of amount of noise in the stored set of pixel values may be stored interleaved with the stored set of pixel values in the buffer.

It is to be noted that the stored set of pixel values and the measure of amount of noise in the stored set of pixel values may be stored at different resolution such that for example some or all of pixel values of the set of pixel values is stored at a higher resolution, such as for each pixel, whereas the measure of amount of noise in the stored set of pixel values is stored at a lower resolution, such as for each n×m pixel where at least one of n and m are larger than one.

A current set of pixel values for the set of one or more pixels in a current video frame is obtained S130 from a sensor. By reference here to a current set of pixel values for 'the set of one or more pixels' is meant that the current set of pixel values is for the set of one or more pixels having the same location in the current video frame as the set of one or more pixels relating to the stored set of pixel values has in each of the previous frames. It is to be noted that the method is applicable also together with image stabilization. In such a case 'same location' may mean the same location after pixels have been moved based on the image stabilization.

A new set of pixel values for the set of one or more pixels for storing in the buffer is then determined S140 based on the stored set of pixel values and the current set of pixel values using the filtering algorithm to reduce temporal noise.

It is to be noted that the stored set of pixel values in the buffer and the current set of pixel values from the sensor may not be in the same domain. For example, the stored set of pixel values may comprise more bits than the current set of pixel values. Hence, the stored set of pixel values and/or the set of current pixel values may need to be transformed in order to enable comparison and combination. This is relevant in relation to determining S140 the new set of pixel values and in any of the following acts where comparison and combination or other relative processing is to be performed in relation to the stored set of pixel values and the current set of pixel values.

The method 100 may further comprise determining S135 a measure of probability that a change in the current set of pixel values in relation to the stored set of pixel values is due to changes in the scene. Determining S140 the new set of pixel values for storing in the buffer may then be based further on the measure of probability that a change in the current set of pixel values in relation to the stored set of pixel values is due to changes in the scene. Determining S135 the new set of pixel values for storing in the buffer may further comprise determining a first weight by which the stored set of pixel values should be multiplied and a second weight by which the current set of pixel values should be multiplied to produce the new set of pixel values. The first weight and second weight may then be determined such that the higher the probability that a change in the current set of pixel values in relation to the stored set of pixel values is due to changes in the scene, the lower the first weight is in relation to the second weight. Determining the probability that a change in the current set of pixel values in relation to the stored set of pixel values is due to changes in the scene aims at determining if a difference between the current set of pixel values and the stored set of pixel values is due to a change in the scene, such as one or more objects moving or change of light conditions etc., or if it is due to noise in the current set of pixel values and or the stored set of pixel values. The probability may be determined based not only on the set of one or more pixels but also on a number of pixels surrounding the set of one or more pixels. For example, if the stored set of pixel values and the current set of pixel values are in relation to a set of one pixel, determining the probability that a difference between the set of current pixel values and the set of stored pixel values relates to changes in the scene may be additionally based on pixels surrounding said one pixel.

Generally, it is assumed herein that the sum of the first weight and the second weight is one. However, this requires that the stored set of pixel values and the current set of pixel values are in the same domain, e.g., that they include the same number of bits. As indicated herein above, this may not be the case. Hence, a transformation may first be necessary of either or both of the stored set of pixel values and the current set of pixel values. In alternative, the weights may be adapted to take such differences into account.

If the probability is high that a change in the current set of pixel values in relation to the stored set of pixel values is due to changes in the scene, it is likely that further changes in the scene will occur also in a next image frame subsequent to the current image frame. In such a case, the new set of pixel values then stored for the current image frame in the buffer will not be used to a large extent when an output set of pixel values, e.g., to be forwarded to an encoded for encoding, is determined for the next image frame. For example, even if the new set of pixel values would have a measure of amount of noise that is low and hence would based on this be subject to low quantization, high quantization can be performed based a high probability that a change in the current set of pixel values in relation to the stored set of pixel values is due to changes in the scene since the new set of pixel values stored in the buffer will then likely not be used to a large extent when determining an output set of pixel values, e.g., for forwarding to the encoder for encoding, in relation to the next video frame. With increased quantization, the compression is increased which in turn reduces the bandwidth required to read from and write to the buffer. Additionally, if the probability is high that a change in the current set of pixel values in relation to the stored set of pixel values is due to changes in the scene, the new set of pixel values then stored for the current image frame in the buffer will likely have a high measure of amount of noise and not be used to a large extent when an output set of pixel values, e.g., to be forwarded to an encoded for encoding, is determined for the next image frame. Hence, high quantization can be performed since the new set of pixel values stored in the buffer will then likely not be used to a large extent when determining an output set of pixel values, e.g., for forwarding to the encoder for encoding, in relation to the next video frame. With increased quantization, the compression is increased which in turn reduces the bandwidth required to read from and write to the buffer.

When determining S140 the new set of pixel values for storing in the buffer, the first weight and the second weight may be determined based further on the measure of amount of noise in the stored set of pixel values such that the higher the measure of amount of noise in the stored set of pixel values, the lower the first weight is in relation to the second weight. For example, if the probability that a change in the current set of pixel values in relation to the stored set of pixel values is due to changes in the scene is determined to be close to zero and the measure of amount of noise is close to zero, the first weight will be close to one and the second weight will be close to zero.

The method 100 may further comprise obtaining (not shown) a measure of amount of noise in the current set of pixel values from the sensor. The amount of noise in the current set of pixel values from the sensor may be determined using a noise model, e.g., as described in "Photon Transfer: DN→λ", James R. Janesick, SPIE Press, Bellingham, Wash., 2007. Determining S140 the new set of pixel values for storing in the buffer may then be determined based further on the measure of amount of noise in the current set of pixel values. For example, when determining S140 the new set of pixel values, the first weight and second weight may be determined based further on the measure of amount of noise in the current set of pixel values such that the higher the measure of amount of noise in the current set of pixel values, the higher the first weight is in relation to the second weight.

After determining S140 the new set of pixel values, a measure of amount of noise in the new set of pixel values is determined S150. The new set of pixel values is a combination of the stored set of pixel values and the current set of pixel values which combination may be based on the probability that difference between the current set of pixel values and the stored set of pixel values is due to changes in the scene, a measure of amount of noise in the stored set of pixel values, and a measure of amount of noise in the current set of pixel values. The measure of amount of noise in the new set of pixel values may be determined from how the stored set of pixel values and the current set of pixel values have been combined, e.g., the size of the first weight and the second weight, together with their respective measure of amount of noise.

The new set of pixel values is then quantized S160 based on the measure of amount of noise in the new set of pixel values. Specifically, the higher the measure of amount of noise in the new set of pixel values, the higher quantizing is performed. Quantization of the new set of pixel values may be performed either in the spatial domain or in the frequency domain. Furthermore, quantization need not be performed separately for the new set of pixel values for the set of one or more pixels but may be performed in relation to the new set of pixel values for the set of one or more pixels in relation to a further new set of pixel values for a set of one or more pixels adjacent to the set of one or more pixels, e.g., by means of quantizing a difference between the new set of pixel values and the further new set of pixel values.

Generally, quantizing is based on division by a quantizing factor and storage of only the integer part of the result. The original values are retained by means of dequantization by multiplication with the quantization factor. Quantization may be performed in a spatial domain and in a frequency domain. For quantization in spatial domain, the quantization may be performed for each set of one or more pixels separately and the size of the quantization factor may be based on the measure of amount of noise for the set of one or more pixels. For the frequency domain, a frequency transform is first performed, e.g., a Fast Fourier transform (FFT), of the image. In such a case, different quantization factors may be used for different frequency components.

If the measure of amount of noise in the new set of pixel values is high, the new set of pixel values will, when it is stored in the buffer not be used to a large extent for producing an output set of pixel values in relation to a next frame subsequent to the current frame. Hence, increasing the quantization in case the measure of amount of noise in the new set of pixel values is high achieves further compression of the new set of pixel values without corresponding reduction of visible side effects. With increased quantization, the compression is increased which in turn reduces the bandwidth required to read from and write to the buffer. Additionally, the time required in relation to reading from and writing to the buffer may be reduced thus causing a reduction of latency.

The quantized new set of pixel values is then compressed S170. For the compression after quantization, any type of lossless compression method may be used. For example prediction based compression (delta encoding) based on earlier sets of pixel values may be used. Preferably the compression uses variable bit length coding and entropy coding.

It is to be noted that the quantization S160 may be performed before or after delta encoding.

The buffer is then updated S180 with the compressed quantized new set of pixel values.

If an additional buffer is used storing the measure of amount of noise in the stored set of pixel values, the additional buffer is updated with the measure of noise in the new set of pixel values now stored in the buffer, e.g., in the form of a level of convergence.

Figure 2:
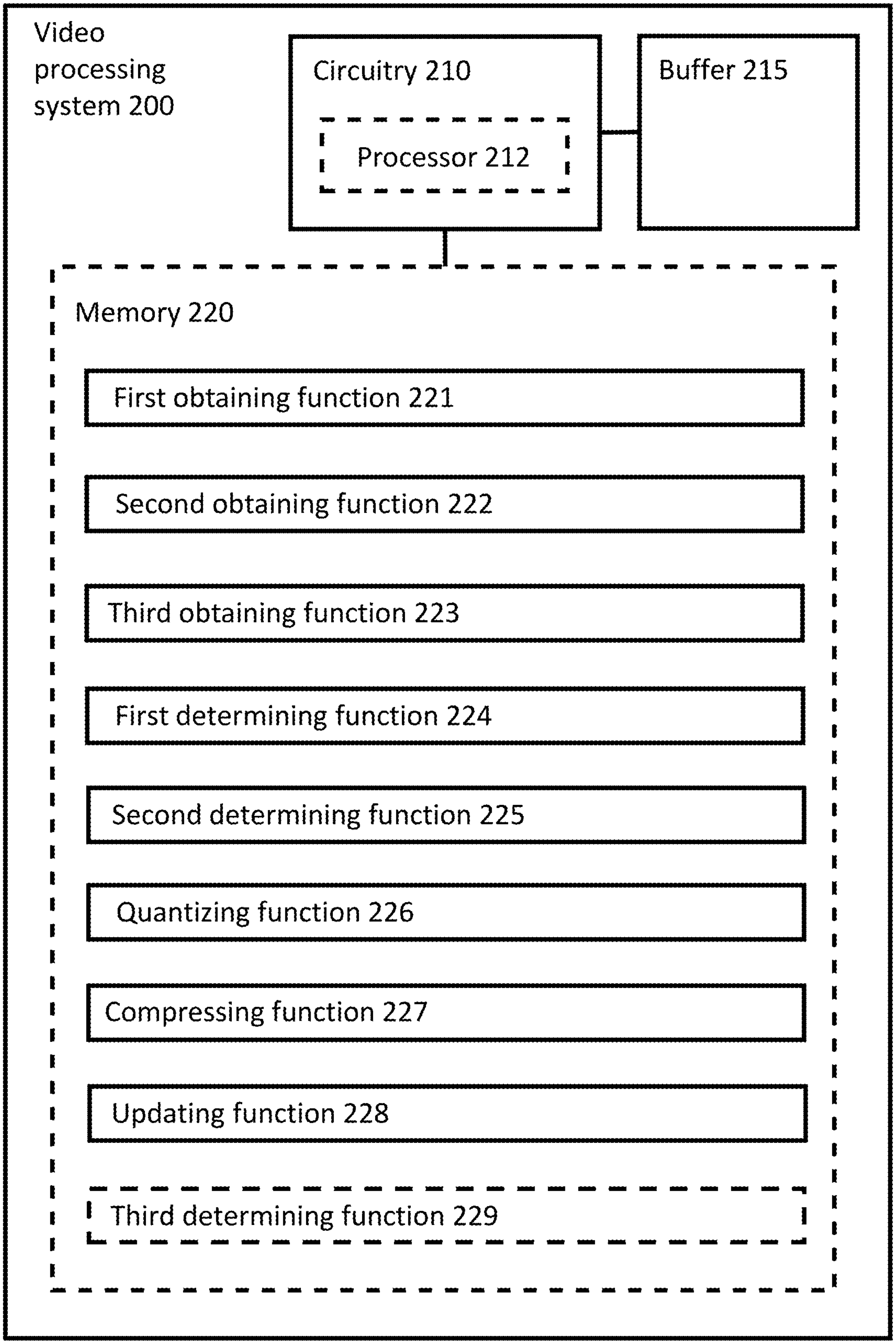
FIG. 2 shows a schematic diagram in relation to embodiments of a video processing system configured for updating a buffer.

FIG. 2 shows a block diagram in relation to embodiments of a video processing system configured for updating a buffer. The image processing system 200 may for example be a camera, be included in a camera or be connected to a camera for capturing a sequence of video frames.

The video processing system 200 comprises circuitry 210. The circuitry 210 is configured to carry out functions of the image processing system 200. The circuitry 210 may include a processor 212, such as for example a central processing unit (CPU), graphical processing unit (GPU), tensor processing unit (TPU), microcontroller, or microprocessor. The processor 212 is configured to execute program code. The program code may for example be configured to carry out the functions of the video processing system 200.

The video processing system 200 may further comprise a memory 220. The memory 220 may be one or more of a buffer, a flash memory, a hard drive, a removable media, a volatile memory, a non-volatile memory, a random access memory (RAM), or another suitable device. In a typical arrangement, the memory 220 may include a non-volatile memory for long term data storage and a volatile memory that functions as device memory for the circuitry 210. The memory 220 may exchange data with the circuitry 210 over a data bus. Accompanying control lines and an address bus between the memory 220 and the circuitry 210 also may be present.

Functions of the video processing system 200 may be embodied in the form of executable logic routines (e.g., lines of code, software programs, etc.) that are stored on a non-transitory computer readable medium (e.g., the memory 220) of the image processing system 200 and are executed by the circuitry 210 (e.g., using the processor 212). Furthermore, the functions of the image processing system 200 may be a stand-alone software application or form a part of a software application that carries out additional tasks related to the video processing system 200. The described functions may be considered a method that a processing unit, e.g., the processor 212 of the circuitry 210 is configured to carry out. Also, while the described functions may be implemented in software, such functionality may as well be carried out via dedicated hardware or firmware, or some combination of hardware, firmware and/or software.

The video processing system 200 further comprises a buffer 215.

The circuitry 210 is configured to execute a first obtaining function 221, a second obtaining function 222, a third obtaining function 223, a first determining function 224, a quantizing function 225, quantizing function 226, a compressing function 227, and an updating function 228. The circuitry 210 is further optionally configured to execute a third determining function 229.

The first obtaining function 221 configured to obtain, from the buffer 215, a stored set of pixel values for a set of one or more pixels relating to previous video frames in a sequence of video frames, wherein the stored set of pixel values has been filtered using a filtering algorithm to reduce temporal noise.

The second obtaining function 222 configured to obtain a measure of amount of noise in the stored set of pixel values.

The third obtaining function 223 configured to obtain, from a sensor, a current set of pixel values for the set of one or more pixels in a current video frame.

The first determining function 224 configured to determine a new set of pixel values for storing in the buffer 215 based on the stored set of pixel values and the current set of pixel values using the filtering algorithm to reduce temporal noise.

The second determining function 225 configured to determine a measure of amount of noise in the new set of pixel values.

The quantizing function 226 configured to quantize the new set of pixel values based on the measure of amount of noise in the new set of pixel values, wherein the higher the measure of amount of noise in the new set of pixel values, the higher quantizing is performed.

The compressing function 227 configured to compress the quantized new pixel value.

The updating function 228 configured to update the buffer 215 with the compressed quantized new set of pixel values.

The circuitry may further be configured to execute a third determining function 229 configured to measure of probability that a change in the current set of pixel values in relation to the stored set of pixel values are due to changes in the scene. In the first determining function 224, the new set of pixel values for storing in the buffer 215 may then be determined based further on the measure of probability that a change in the current set of pixel values in relation to the stored set of pixel values is due to changes in the scene.

The first determining function 224 may be further configured to determine a first weight by which the stored set of pixel values should be multiplied and a second weight by which the current set of pixel values should be multiplied to produce new pixel value, wherein the higher the probability that a change in the current set of pixel values in relation to the stored set of pixel values is due to changes in the scene, the lower the first weight is in relation to the second weight. The first weight and the second weight may be determined such that the higher the measure of amount of noise in the stored set of pixel values, the lower the first weight is in relation to the second weight.

The first determining function 224 may be configured to determine the new set of pixel values for storing in the buffer based further on the measure of amount of noise in the stored set of pixel values.

The buffer 215 may be an infinite impulse response, IIR, buffer 115, and wherein the filter algorithm used to reduce temporal noise is IIR filtering.

The first obtaining function 221 may be configured to retrieve, from the buffer 115, compressed stored set of pixel values for the set of one or more pixels relating to previous video frames in the sequence of video frames, wherein the compressed stored set of pixel values has been filtered using a filtering algorithm to reduce temporal noise, and decompress the compressed stored set of pixel values to obtain the stored set of pixel values.

The detailed description of the acts of the method 100 described in relation to FIG. 1 hereinabove apply also for the corresponding functions of the image processing system 200. Furthermore, the optional additional features of the method 100 described in relation to FIGS. 1*a* and 1*b* hereinabove, when applicable, apply also to the image processing system 200.

A person skilled in the art realizes that the present invention is not limited to the embodiments described above. On the contrary, many modifications and variations are possible within the scope of the appended claims. Such modifications and variations can be understood and effected by a skilled person in practicing the claimed invention, from a study of the drawings, the disclosure, and the appended claims.

The invention claimed is:

1. A buffer updating method comprising:

obtaining, from a buffer, a stored set of pixel values for a set of one or more pixels relating to previous video frames in a sequence of video frames, wherein the stored set of pixel values has been filtered reducing temporal noise;

obtaining, from a sensor, a current set of pixel values for the set of one or more pixels in a current video frame;

determining a measure of probability that a change in the current set of pixel values in relation to the stored set of pixel values is due to changes in a scene captured in the video frames, determining a new set of pixel values for the set of one or more pixels for storing in the buffer based on the stored set of pixel values and the current set of pixel values reducing temporal noise and on the measure of probability that a change in the current set of pixel values in relation to the stored set of pixel values is due to changes in the scene;

determining a measure of amount of noise in the new set of pixel values;

quantizing the new set of pixel values based on the measure of amount of noise in the new set of pixel values and on the measure of probability that a change in the current set of pixel values in relation to the stored set of pixel values is due to changes in the scene, wherein the higher the measure of amount of noise in the new set of pixel values, the higher quantizing is performed, and wherein the higher the measure of probability that a change in the current set of pixel values in relation to the stored set of pixel values is due to changes in the scene, the higher quantizing is performed independently of the measure of amount of noise;

compressing the quantized new set of pixel values; and updating the buffer with the compressed quantized new set of pixel values.

2. The buffer updating method according to claim 1, wherein determining the new set of pixel values for storing in the buffer further comprises:

determining a first weight by which the stored set of pixel values are multiplied and a second weight by which the current set of pixel values are multiplied to produce the new set of pixel values, wherein the higher a probability that a change in the current set of pixel values in relation to the stored set of pixel values is due to changes in the scene, the lower the first weight is in relation to the second weight.

3. The buffer updating method according to claim 2, further comprising:

determining the measure of amount of noise in the stored set of pixel values, wherein the higher the measure of amount of noise in the stored set of pixel values, the lower the first weight is in relation to the second weight.

4. The buffer updating method according to claim 1, further comprising:

determining the measure of amount of noise in the stored set of pixel values, wherein determining new set of pixel values for storing in the buffer is further based on the measure of amount of noise in the stored set of pixel values.

5. The buffer updating method according to claim 1, wherein the buffer is an infinite impulse response (IIR) buffer, and wherein an IIR filter reduces temporal noise.

6. The buffer updating method according to claim 1, wherein obtaining, from the buffer, the stored set of pixel values comprises:

retrieving, from the buffer, compressed stored set of pixel values for the set of one or more pixels relating to previous video frames in the sequence of video frames, wherein the compressed stored set of pixel values has been filtered by means of a filtering algorithm that reduces temporal noise; and decompressing the compressed stored set of pixel values to obtain the stored set of pixel values.

7. A non-transitory computer-readable storage medium having stored thereon instructions which, when executed in a video processing system having a processing capability, cause the video processing system to perform operations according to the method according to claim 1.

8. A video processing system comprising circuitry for updating a buffer and executes:

obtaining, from the buffer, a stored set of pixel values for a set of one or more pixels relating to previous video frames in a sequence of video frames, wherein the stored set of pixel values has been filtered reducing temporal noise;

obtaining, from a sensor, a current set of pixel values for the set of one or more pixels in a current video frame;

determining a measure of probability that a change in the current set of pixel values in relation to the stored set of pixel values is due to changes in a scene captured in the video frames, determining a new set of pixel values for the set of one or more pixels for storing in the buffer based on the stored set of pixel values and the current set of pixel values reducing the temporal noise and on the measure of probability that a change in the current set of pixel values in relation to the stored set of pixel values is due to changes in the scene;

determining a measure of amount of noise in the new set of pixel values;

quantizing the new set of pixel values based on the measure of amount of noise in the new set of pixel values and on the measure of probability that a change in the current set of pixel values in relation to the stored set of pixel values is due to changes in the scene, wherein the higher the measure of amount of noise in the new set of pixel values, the higher quantizing is performed, and wherein the higher the measure of probability that a change in the current set of pixel values in relation to the stored set of pixel values is due to changes in the scene, the higher quantizing is performed independently of the measure of amount of noise;

compressing the quantized new set of pixel values; and updating the buffer with the compressed quantized new set of pixel values.

9. The video processing system according to claim 8, wherein the determining a new set of pixel values comprises determining a first weight by which the stored set of pixel values are multiplied and a second weight by which the current set of pixel values are multiplied to produce new set of pixel values, and wherein the higher the measure of the probability that the change in the current set of pixel values in relation to the stored set of pixel values is due to changes in the scene, the lower the first weight is in relation to the second weight.

10. The video processing system according to claim 4, wherein the video processing system executes:

determining the measure of amount of noise in the stored set of pixel values, wherein the higher the measure of amount of noise in the stored set of pixel values, the lower the first weight is in relation to the second weight.

11. The video processing system according to claim 8, wherein the video processing system executes:

determining the measure of amount of noise in the stored set of pixel values, wherein determining the new set of pixel values for storing in the buffer is further based on the measure of amount of noise in the stored set of pixel values.

12. The video processing system according to claim 8, wherein the buffer is an infinite impulse response (IIR) buffer, and wherein an IIR filter reduces temporal noise.

13. The video processing system according to claim 8, wherein the obtaining comprises:

retrieve, from the buffer, a compressed stored set of pixel values for the set of one or more pixels relating to previous video frames in the sequence of video frames, wherein the compressed stored set of pixel values has been filtered by means of a filtering algorithm that reduces temporal noise; and decompress the compressed stored set of pixel values to obtain the stored set of pixel values.

* * * * *